July 21, 1959 S. D. WOOTEN, JR 2,896,022

INTERCOMMUNICATION SYSTEM

Filed March 9, 1955 2 Sheets-Sheet 1

INVENTOR

SPENCER D. WOOTEN JR.

BY *Mead, Browne, Schuyler & Beveridge* ATTORNEYS

July 21, 1959 S. D. WOOTEN, JR 2,896,022

INTERCOMMUNICATION SYSTEM

Filed March 9, 1955 2 Sheets-Sheet 2

INVENTOR

SPENCER D. WOOTEN JR.

BY Mead, Browne, Schuyler & Beveridge ATTORNEYS 2,896,022

INTERCOMMUNICATION SYSTEM

Spencer D. Wooten, Jr., Memphis, Tenn., assignor to Home Music Systems, Inc., Memphis, Tenn., a corporation of Tennessee Application March 9, 1955, Serial No. 493,137

14 Claims. (Cl. 179—1)

This invention relates to intercommunication systems suitable for use in homes, offices, and the like, and more particularly to an intercommunication distribution system which permits any speaker station to call all other stations in the system using only a single amplifier at the master unit.

In the conventional intercommunication system having a master unit with an amplifier and a plurality of remote speaker stations without individual amplifiers, the master unit can call all remote stations. However, the remote stations can usually call only the master unit and cannot call other remote stations. Systems which permit remote stations to call all other stations usually require an individual amplifier at each station. The use of a separate amplifier at each station. The use of a separate amplifier at each station is quite expensive and renders the cost of such a system almost prohibitive for use in ordinary homes and offices.

Accordingly, it is an object of this invention to provide an inexpensive and easily installed intercommunication system, particularly suitable for use in homes and offices.

It is another object of this invention to provide an improved intercommunication distribution system which permits each speaker station to speak to all other speaker stations.

It is still another object of this invention to provide an intercommunication system utilizing only a single amplifier and in which each speaker station may be connected to all other stations for intercommunication.

It is a further object of this invention to provide an intercommunication system utilizing only a single amplifier and including switching means for switching any speaker station to the input of the amplifier for transmitting an intercom signal, and for simultaneously insuring that all other speaker stations which are not transmitting an intercom signal are connected to the output of the amplifier for receiving the intercom signal.

It is a still further object of this invention to provide an intercommunication system having a single amplifier at a master unit and including an over-ride circuit which connects any speaker to the output of the amplifier whose respective control switch may be in an off position.

Figure 1:
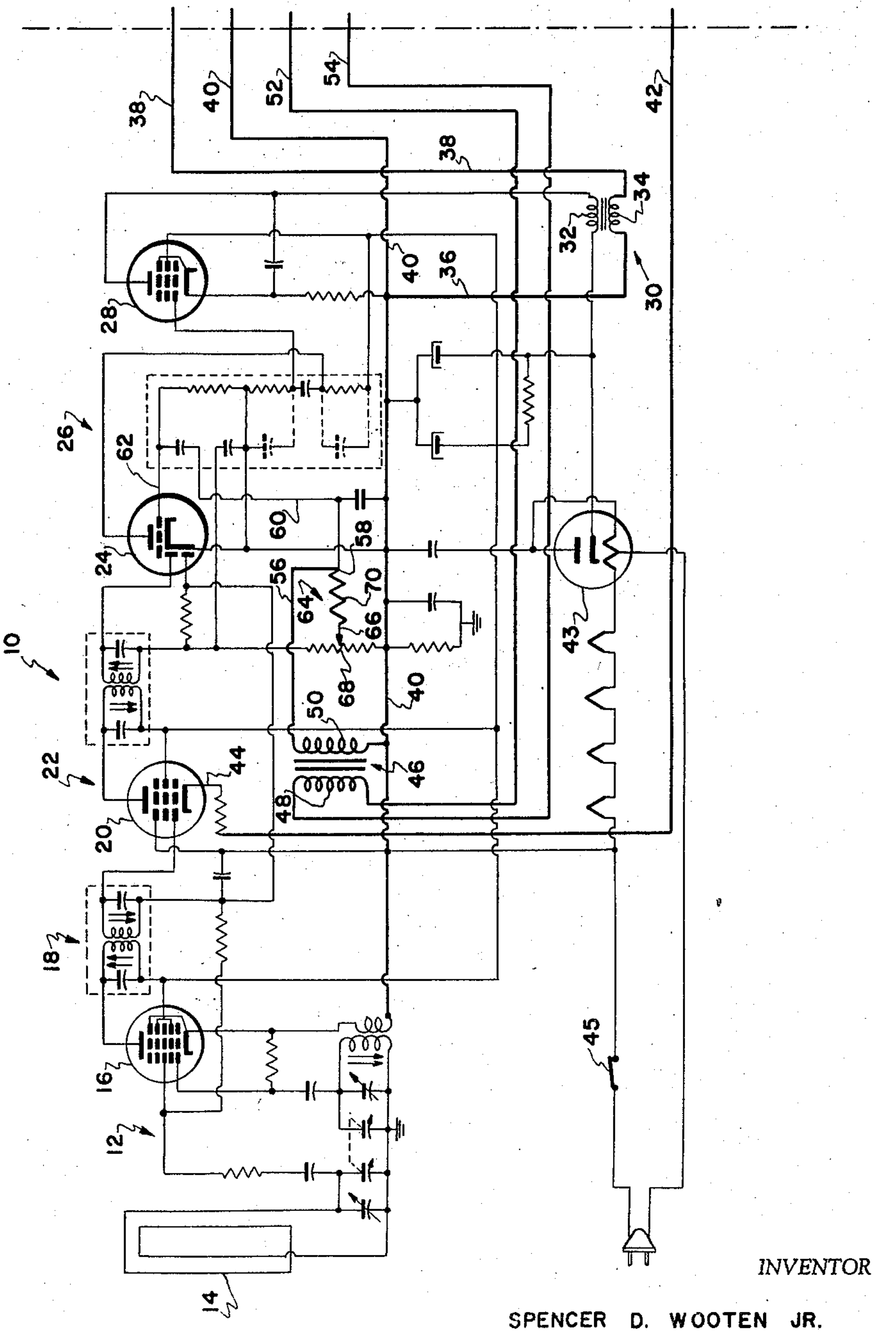
Figure 1B:
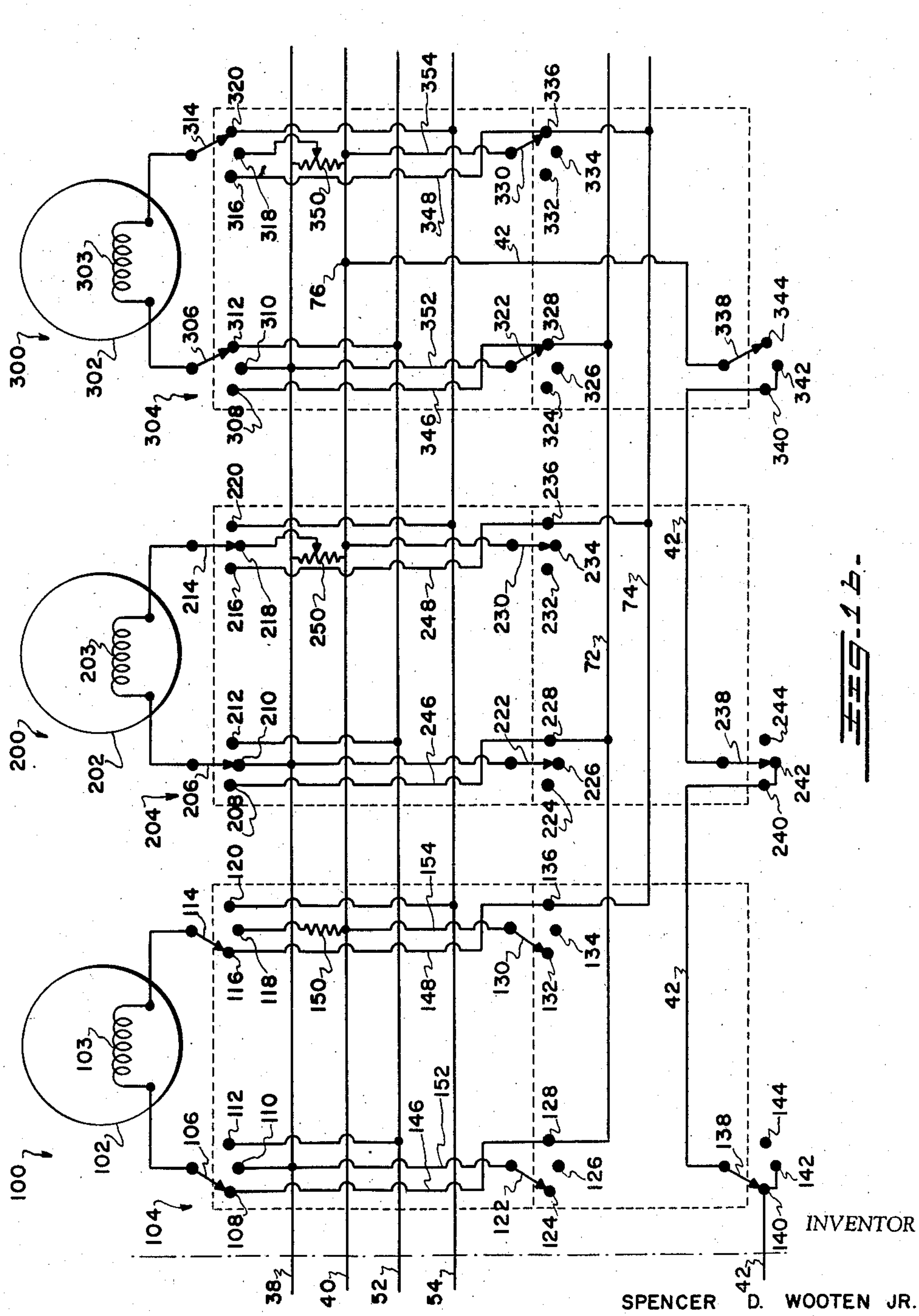

Further objects and advantages of the invention will become apparent from the following description taken in conjunction with the accompanying drawings in which:

Fig. 1*a* is an electrical circuit diagram of the portion of the intercommunication system including the amplifier; and Fig. 1*b* is a continuation of the circuit diagram of Fig. 1*a* showing the switching and distribution arrangement of the speaker stations associated with the system.

Referring now to the drawings, and more particularly to Fig. 1*a*, the intercommunication system of the invention is illustrated in conjunction with a superheterodyne radio receiver of conventional design generally indicated at 10. Receiver 10 includes a radio frequency section generally indicated at 12 including an antenna 14 which is coupled to the input grid of tube 16 of the oscillator-converter stage 18. The output of oscillator-converter stage 18 is coupled to the input of tube 20 of the intermediate frequency section 22. The output of intermediate frequency section 22 is coupled to tube 24 of the combined second detector and first audio stage 26. The audio output of stage 26 is coupled to amplifier tube 28 which constitutes the second amplifier stage.

The primary winding 32 of an audio frequency output transformer generally indicated at 30 is connected in the output or plate circuit of amplifier tube 28. Output transformer 30 includes a secondary winding 34 having output conductors 36 and 38, respectively. Output conductor 36 is connected to ground line 40. The input power to the radio circuit is obtained through a rectifier tube 43 which is connected to a source of A.C. power through switch 45.

The radio receiver thus far described is a conventional five-tube superheterodyne receiver. This receiver, together with a speaker station generally indicated at 100 and an associated control switch generally at 104, is positioned in the master unit of the intercommunication system. Any number of sub-stations, such as those generally indicated at 200 and 300, respectively, and a control switch, are connected to the master unit. The sub-stations are located remotely from the master unit as, for example, in various rooms of the house or office building.

In the embodiment shown in the drawings, the sub-stations 200 and 300, each with their respective control switches 204 and 304, are shown in addition to the speaker station 100 located at the master unit. However, any number of speaker stations may be connected in the system consistent with the power rating of the master unit.

In order to interrupt the radio signal input to the amplifier stages 26 and 28 when it is desired to use the apparatus for intercommunication purposes, means are provided for permitting the control switch at any speaker station to interrupt the circuit of cathode 44 of tube 20 in intermediate frequency stage 22. For this purpose, a conductor 42 connected to cathode 44 extends between each of the stations 100, 200 and 300 in series with appropriate contacts at the respective stations in such manner that movement of the control switch at any station to intercom position causes opening of the circuit of cathode 44, thereby interrupting the radio signal input to the amplifier stages. The circuit of cathode 44 is completed to the ground line 40 at the last station 300.

While the radio input signal to the amplifier stages is interrupted in the illustrated embodiment by opening the circuits of cathode 44, obviously the radio signal may be interrupted in other ways such as, for example, by opening the cathode circuit of tube 16.

In order to couple the audio frequency input of the various speaker stations 100, 200 and 300 to the audio frequency stages 26 and 28 when the apparatus is being used for intercommunication purposes, an audio frequency transformer generally indicated at 46 is provided and includes an input or primary winding 48 and an output or secondary winding 50. Conductors 52 and 54 are connected to opposite ends of input winding 48, conductors 52 and 54 being connected to speaker stations 100, 200 and 300 as will be hereinafter described.

One end of secondary winding 50 of audio frequency transformer 46 is connected to ground line 40. The opposite and of winding 50 is connected by means of conductor 56, junction 58 and conductor 60 to control grid 62 of tube 24 in the first amplifier stage 26. A volume control potentiometer generally indicated at 64, including movable contactor 66, and resistance 68 in the output circuit of intermediate frequency section 22, is also connected to control grid 62 of tube 24 in accordance with the conventional method of obtaining manual volume control. However, the conventional circuit has been modified at this point by the introduction of a resistor 70, which may have a magnitude of approximately 220,000 ohms, for example, between movable contact 66 of potentiometer 64 and junction 58 where conductor 56 from transformer winding 50 joins conductor 60 leading to grid 62 of tube 24. The purpose of introducing resistor 70 is to prevent short circuiting of secondary winding 50 when movable contact 66 of the potentiometer is turned to off or low volume position. The use of resistor 70 thereby avoids short circuiting the input signal from the intercom system when the manual radio volume control is turned to low or off position.

Each of the respective speaker stations 100, 200 and 300 is provided with a terminal strip to which the conductors 38, 40, 52, 54 and 42 are connected. In addition, a pair of conductors 72 and 74 extend between the terminal strips of the respective speaker stations as part of an override circuit to be hereinafter described. In practice, conductors 38, 40, 52, 54, 42, 72 and 74 may be included in a single seven-conductor cable. Conductors 38 and 40 from output winding 34 are preferably twisted on themselves in the cable, and similarly conductors 52 and 54 to input winding 48 are preferably twisted on themselves. By twisting the respective pairs of conductors 38—40 and 52—54 as just described, feed-back between the output and input circuits is substantially eliminated.

At each speaker station 100, 200, 300 a five-pole, three-position switch 104, 204, or 304 is provided, the switch being movable from an off position at the left with respect to the view shown in Fig. 1*b*, to a listen position (the intermediate position) to intercom or speak position at the right. The control switch is preferably so constructed that it must be moved against a spring bias when moved into intercom or speak position, the switch moving out of intercom position when manual pressure is released. This insures that the switch is not placed in intercom position unless the operator intentionally holds the switch in this position. Suitable latching means may be provided to hold the switch in intercom position when desired.

The contacts and internal connections of switch 104 at speaker station 100 will be described. The contacts and connections of switches 204 and 304 at speaker stations 200 and 300 are similar to those of switch 104, corresponding parts of switches 204 and 304 being identified by corresponding numbers in the 200 and 300 series, respectively.

Switch 104 includes movable contacts 106, 114, 122, 130 and 138 which move in tandem to corresponding positions relative to the three fixed contacts associated with each movable contact. Movable contacts 106 and 114 are connected to opposite ends of the speaker coil of speaker 102. The function of contacts 106 and 114 is to selectively connect speaker 102 to output transformer 34 when the switch is in listen position, to input transformer 46 when the switch is in intercom position, and in off position to "set up" the override circuit through conductors 72 and 74 so that speaker 102 may receive intercom signals even when switch 104 is in off position with respect to the source of auxiliary signals, such as a radio receiver.

Movable contacts 122 and 130 are connected to conductors 38 and 40 as part of the override circuit, these connections being effective to establish a circuit only when the switch is in intercom position. The function of movable contact 138 is to open or close the cathode circuit of tube 20 to interrupt or conduct the radio signal to the amplifier stages.

In the off, listen and intercom positions, movable contact 106 is selectively movable into engagement with fixed contacts 108, 110 and 112, respectively; movable contact 114 is selectively movable into engagement with fixed contacts 116, 118 and 120, respectively; movable contact 122 is movable into engagement with fixed contacts 124, 126 and 128, respectively; movable contact 130 is movable into engagement with fixed contacts 132, 134 and 136, respectively; and movable contact 138 is movable into engagement with fixed contacts 140, 142 and 144, respectively.

The connection from speaker station 100 to the output of the amplifier is obtained through fixed contacts 110 and 118 which are respectively connected to conductors 38 and 40 and thus to the output transformer winding 34 of the amplifier stage. A fixed resistance 150 is interposed in series between contact 118 and conductor 40 to limit the volume to coil 103 of speaker 102. Variable resistances 250 and 350 are used in the corresponding circuit positions in speaker stations 200 and 300.

The connection of station 100 to the input of the amplifier is accomplished through fixed contacts 112 and 120 which are respectively connected to conductors 52 and 54 and thus to winding 48 of input transformer 46.

The "set up" connection of speaker station 100 to the override circuit which permits the speaker to receive intercom signals even when in off position is obtained through fixed contacts 108 and 116 which are respectively connected through conductors 146 and 148 to fixed contacts 128 and 136 and thus to conductors 72 and 74 of the override circuit. Similarly, fixed contacts 208 and 216 of speaker station 200 are connected through conductors 246 and 248 and fixed contacts 228 and 236 to conductors 72 and 74 of the override circuit. Also, fixed contacts 308 and 316 of speaker station 300 are connected through conductors 346 and 348 and fixed contacts 328 and 336 to conductors 72 and 74 of the override circuit.

The override circuit set up by the engagement of movable contacts 106 and 114 with fixed contacts 108 and 116 of the speaker in off position is completed through the engagement of movable contacts 122 and 130 with fixed contacts 128 and 136 of the speaker in intercom position. Movable contacts 122 and 130 are respectively connected through conductors 152 and 154 to conductors 38 and 40 and thus to output transformer winding 34. Thus, when movable contacts 122 and 130 engage fixed contacts 128 and 136, override conductors 72 and 74 are connected to output transformer winding 34, so that any speaker whose switch is in off position is connected to output winding 34 through the switch which is in intercom position.

Fixed contacts 124, 126, 132, 134 and 144 of switch 104, and the corresponding contacts of switches 204 and 304 are blank so that no electrical circuit is completed when the movable contacts 122, 130 and 138; 222, 230 and 238; or 322, 330 and 338 engage these respective fixed contacts.

Conductor 42 in the cathode circuit of tube 20 is connected to fixed contact 140, contacts 140 and 142 being connected together. Movable contacts 138, 238 and 338 are connected in series with each other and with conductor 42 to close the cathode circuit of tube 20. Conductor 42 is connected to ground line 40 at junction 76 in speaker station 300 after passing through movable contact 338 at station 300. Movement of any one of the movable contacts 138, 238, 338 to open circuit position opens the circuit of cathode 44 and thus disconnects the radio input signal from the amplifier.

*Operation*

With switch 45 in closed position so that power is being supplied through rectifier 43 to the radio receiver, and with the switches 104, 204 and 304, respectively, in off, listen and intercom position, the operation of the system is as follows: since movable contacts 306 and 314 at station 300 are in engagement with fixed contacts 312 and 320, respectively, the speaker coil 303 of speaker 302 is directly connected across conductors 52 and 54 and thus to the input transformer 46. Speaker 302 when spoken into will develop a signal voltage which is applied through secondary winding 50 to the input grid of tube 24 of the amplifier stage 26 and thence to the amplifier tube 28. The audio output from tube 28 thence passes through output transformer 30 to conductor 38 and ground line 40.

With switch 304 in the intercom position, movable contact 338 engages blank fixed contact 344 and thus the circuit of the cathode of tube 20 in the intermediate frequency stage 22 is opened. Hence, no radio signal is applied to the amplifier stages.

Speaker 202 is connected directly across conductor 38 and ground line 40 through movable contacts 206 and 214 and fixed contacts 210 and 218, respectively. Speaker 202 is thereby directly connected to the secondary winding 34 of output transformer 30 and thus receives the audio output signal from the amplifier stages in accordance with the audio intercom signal developed at speaker 302.

With switch 304 of station 300 in intercom position, as shown, an override circuit is also completed through conductors 72 and 74 which connects speaker 102 of station 100 to the output transformer 30 despite the fact that switch 104 is in off position. Thus, the intercom signal developed at speaker 302 is heard over speaker 102 despite the fact that the control switch of speaker 102 is in off position. The override circuit which makes this possible will now be described.

With switch 304 in intercom position movable contacts 322 and 330, respectively, engage fixed contacts 328 and 336. At the same time, movable contacts 106 and 114 of switch 104 engage fixed contacts 108 and 116, respectively, with switch 104 in the off position. The speaker coil 103 of speaker 102 is connected to conductor 38 and ground line 40 and thus to output transformer 30 through the following circuit: from one side of speaker coil 103 through movable contact 106, fixed contact 108, conductor 146, fixed contact 128, conductor 72, fixed contact 328, movable contact 322, conductor 352 to conductor 38 and thus to one side of output transformer secondary winding 34. The other side of the coil 103 of speaker 102 is connected to movable contact 114, fixed contact 116, conductor 148, fixed contact 136, conductor 74, fixed contact 336, movable contact 330, and thence by conductor 354 to ground line 40 to which one end of secondary winding 34 of output transformer 30 is connected.

It will thus be seen that the control switch which is in off position "sets up" an override circuit to the output of the amplifier, the override circuit being completed through the switch which is turned to intercom position. Thus, any speaker station whose control switch is on off position with respect to the auxiliary signal source nevertheless receives intercom signals.

It can be seen from the foregoing that there is provided in accordance with this invention an intercommunication system which is simple in construction and which may be easily installed in homes and office buildings. The distribution system of the invention permits each speaker station in the system to speak to all other stations through the amplifier at the master unit. This avoids the use of separate amplifiers at each station, usually required where each station speaks to all other stations, thereby greatly reducing the cost of the system. Furthermore, the switching and distribution system includes means for setting up and completing an override circuit for any speaker station which may be in an off position with respect to the auxiliary signal source, to thereby cause the speaker in off position to receive intercom signals despite the fact that its control switch is in off position.

The intercommunication system hereinbefore described is ideally suited for use in detecting sounds in the household, such as in the nursery, thus making the intercommunication system an invaluable aid in "baby sitting." The speaker located in the nursery may be locked in intercom position by means of a suitable latching means provided at the control switch of the respective speaker. Other speakers in the house may then have their respective control switches turned to listen position, where they will pick up any sounds of the baby or other children. However, if it is desired to use any other speaker or speakers to transmit an intercom signal, the other speaker or speakers may have their respective switches turned to intercom position. These additional speakers will then also be connected to the input of the amplifier and may transmit an intercom signal. The speaker in the nursery remains connected to the amplifier input to transmit any sounds of the baby. Thus, with the intercom distribution system of this invention, the fact that one speaker is already connected to the input of the amplifier, even being locked in intercom position as in the case of the speaker in the nursery, does not prevent other speakers from also being simultaneously connected to the amplifier input for transmitting an intercom signal.

While the illustrated embodiment of the invention includes a radio receiving circuit as the source of auxiliary signals, obviously other sources of auxiliary signals could be used, such as a phonograph, for example.

While there has been shown and described a particular embodiment of the invention, it will be obvious to those skilled in the art that various changes and modifications may be made therein without departing from the invention and, therefore, it is aimed to cover all such changes and modifications as fall within the true spirit and scope of the invention.

What I claim as my invention is:

1. An intercommunication system comprising an amplifier, a plurality of speaker stations, means associated with each speaker station for selectively connecting its respective speaker to the output or to the input of said amplifier and for disconnecting its respective speaker from said amplifier, and means effective upon the connection of any speaker to the input of said amplifier for connecting to the output of said amplifier any speaker disconnected from said amplifier.

2. An intercommunication system comprising an amplifier, an auxiliary source of input signals to said amplifier, a plurality of speaker stations, means associated with each speaker station for selectively connecting its respective speaker to the output or to the input of said amplifier and for disconnecting its respective speaker from said amplifier, and means effective upon the connection of any speaker to the input of said amplifier for connecting to the output of said amplifier any speaker disconnected from said amplifier.

3. An intercommunication system comprising an amplifier, a plurality of speaker stations, means associated with each speaker station for selectively connecting its respective speaker to the output or to the input of said amplifier and for disconnecting its respective speaker from said amplifier, and cooperating means at the speaker station whose speaker is disconnected from said amplifier and at the station whose speaker is connected to the input of said amplifier for connecting said disconnected speaker to the output of said amplifier for receiving an intercommunication signal.

4. An intercommunicaiton system comprising an amplifier, a plurality of speaker stations, switch means associated with each speaker station for selectively connecting its respective speaker to the output or to the input of said amplifier and for disconnecting its respective speaker from said amplifier, the switch means at a station whose speaker is disconnected from said amplifier cooperating with the switch means of a station whose speaker is connected to the input of said amplifier to complete an override circuit connecting said disconnected speaker to the output of said amplifier.

5. An intercommunication system comprising an amplifier, a plurality of speaker stations, switch means associated with each speaker station for selectively connecting its respective speaker to the output or to the input of said amplifier, the respective switch means at each station also being movable to an off position in which its respective speaker is disconnected from said amplifier, and means effective upon the connection of any speaker to the input of said amplifier for connecting any speaker whose switch means is in off position to the output of said amplifier.

6. An intercommunication system comprising an amplifier having an output end and an input end, at least two independent speakers, switch means associated with each speaker for selectively connecting the respective speaker either to said output or input ends of said amplifier, each switch means having an off position in which its respective speaker is disconnected from said amplifier, and means associated with each speaker when the respective speaker is connected to the input end of said amplifier for connecting any speaker whose switch means is in off position to the output end of said amplifier.

7. An intercommunication system comprising an amplifier having an input end and an output end, at least two independent speaker means, means for connecting each speaker means to the output of said amplifier, an override circuit including said output end of said amplifier means for disconnecting each speaker from said amplifier and for concurrently connecting the respective speaker to said override circuit, and means for connecting each speaker to the input end of said amplifier and for concurrently completing said override circuit to the output of said amplifier whereby a speaker disconnected from said amplifier is connected to the output of said amplifier for receiving an intercom signal.

8. An intercommunication system comprising an amplifier, a plurality of speaker stations, switch means associated with each speaker station for selectively connecting its respective speaker to the output or to the input of said amplifier, the respective switch means of each station also being movable to an off position in which its respective speaker is disconnected from said amplifier, and an override circuit extending between said speaker stations for connecting a speaker whose switch means is in off position to the output of said amplifier when another speaker is connected to the input of said amplifier.

9. An intercommunication system comprising an amplifier, a plurality of speaker stations, switch means associated with each speaker station for selectively connecting its respective speaker to the output or to the input of said amplifier, the respective switch means of each station also being movable to an off position in which its respective speaker is disconnected from said amplifier, an override circuit extending between said speaker stations for connecting a speaker whose switch is in off position to the output of said amplifier when another speaker is connected to the input of said amplifier, said override circuit being completed through the switch means in off position and through the switch means of the speaker connected to the input of said amplifier.

10. An intercommunication system comprising an amplifier, a plurality of speaker stations, a switch means associated with each speaker station, each switch means having an off position in which the speaker associated with the respective switch is disconnected from said amplifier, each switch having second and third positions in which the respective speaker station is respectively connected to the output and input ends of the amplifier, and an override circuit extending between said stations and effective when an intercom signal is being transmitted to connect to the output of said amplifier any speaker whose switch means is in off position, said override circuit being completed through the switch means in off position and through the switch means of a speaker connected to the input of said amplifier.

11. An intercommunication system comprising an amplifier, an auxiliary source of input signals to said amplifier, a plurality of speaker stations, a switch means associated with each speaker station, each switch means having an off position in which the speaker associated with the respective switch is disconnected from said amplifier, each switch having second and third positions in which the respective speaker station is respectively connected to the output and input ends of the amplifier, and an override circuit extending between said stations for connecting to the output of said amplifier any speaker whose respective control switch is in off position.

12. An intercommunication system comprising an amplifier having an input and an output end, at least two independent speakers, an override circuit including said output end of said amplifier a switch means associated with each speaker, each switch means being movable to an off position in which its respective speaker is connected to a portion of said override circuit, each switch being movable to a listen position in which the speaker is connected to the output end of said amplifier, each switch being movable to an intercom position in which the speaker is connected to the input end of said amplifier, the switch in said intercom position completing the override circuit through a switch in off position, whereby a speaker whose switch is in off position is connected to the output of said amplifier.

13. An intercommunication system comprising an amplifier, a plurality of speaker stations each including a speaker and a control switch means, electrically distinct conductor means respectively directly connecting each speaker station to the output and input of said amplifier, the switch means at each station being selectively movable to connect the speaker at the respective station to either the output or the input of said amplifier independently of the connections of the speakers at the other stations, whereby a plurality of speaker stations may be simultaneously connected to the output or to the input of said amplifier.

14. An intercommunication system comprising an amplifier, a plurality of speaker stations each including a speaker and a control switch means, a first and a second conductor means electrically distinct from each other respectively directly connecting each speaker station to the output and to the input of said amplifier, means for locking a given speaker in connected relation to the input of said amplifier, speakers other than said given speaker also being connectable through their respective control switches to the input of said amplifier simultaneously with the connection of said locked speaker.

References Cited in the file of this patent

UNITED STATES PATENTS

| | | |
|---|---|---|
| 1,944,308 | Turner | Jan. 23, 1934 |
| 2,099,442 | Howell | Nov. 16, 1937 |
| 2,186,500 | Schnell | Jan. 9, 1940 |
| 2,496,398 | Lambert | Feb. 7, 1950 |
| 2,794,857 | Doriot | June 4, 1957 |